United States Patent [19]

Samuels

[11] Patent Number: 4,736,240
[45] Date of Patent: Apr. 5, 1988

[54] ANALOG TO DIGITAL VIDEO ADAPTER

[76] Inventor: James V. Samuels, 17 Harper Rd., Monmouth Junction, N.J. 08852

[21] Appl. No.: 856,660

[22] Filed: Apr. 28, 1986

[51] Int. Cl.[4] .............................................. H04N 9/64
[52] U.S. Cl. ................... 358/21 R; 358/22; 358/27
[58] Field of Search .................. 358/22, 64, 21 R, 27, 358/81, 82; 340/703

[56] References Cited

U.S. PATENT DOCUMENTS

| | | | |
|---|---|---|---|
| 3,812,488 | 5/1974 | Yoshino | 340/703 |
| 4,020,501 | 4/1977 | Hillberger | 358/64 |
| 4,149,184 | 4/1979 | Giddings | 340/703 |
| 4,183,046 | 1/1980 | Dalke | 340/703 |
| 4,516,118 | 5/1985 | Wahlquist | 340/703 |

Primary Examiner—Michael A. Masinick

[57] ABSTRACT

The invention processes a National Television System Committee (NTSC) standard video signal to allow a digital, transistor to transistor logic (TTL), 8 color, separate red, green, and blue (RGB) video, color monitor to be used to display television (TV) images. The infinite colors necessary for TV are produced on an 8 color TTL monitor through pulse width modulation. Thus, the width of the TTL video pulse to each color input of the monitor is proportional to the brightness required that is contained in the NTSC signal.

2 Claims, 1 Drawing Sheet

ANALOG TO DIGITAL VIDEO ADAPTER

BACKGROUND OF THE INVENTION

With the growth of the personal computer (PC), the PC color monitor has become very popular. The PC monitor differs from a TV set in that it has higher resolution, does not have a tuner, and has separate TTL video and sync signals. The separate RGB signals ae essential to produce the high resolution necessary to display small, readable text on the monitor. The composite signal used for color TV is limited to a 3.58 MHZ video bandwidth due to the nature of the NTSC signal. A standard PC uses a 14.318 MHZ dot clock for its video, thereby making a composite signal impractical.

To cut down on cost and the lack of need for many colors, a standard PC color monitor can only display 8, 16 or 64 separate colors, depending on the PC and monitor. The video signas are digital (either on or off) as opposed to the analog (infinite color availability) signal generated for TV.

It was believed that an RGB TTL monitor cannot be used to generate the infinite shades of color necessary for TV use. The Analog To Digital Video Adapter does just that. The invention converts the NTSC analog signal to pulse width modulated TTL RGB video signals, and produces infinite colors and TV quality to an 8 color monitor.

The invention requires that an NTSC standard color signal is supplied to it since it does not contain a tuner or receiver. All video cassett recorders (VCR) have a tuner and virtually all of them have a composite video output that will interface to the invention. The popularity of the VCR, along with the PC, makes the invention the perfect device to inexpensively add a TV to the home or office that already have a PC monitor and a VCR.

The prior art demonstrates how to make an 8 color (RGB digital) color monitor to perform as a 64 color (R1,R2,G1,G2,B1,B2 digital) monitor when the monitor is driven from a computer; see Wahlquist in U.S. Pat. No. 4,516,118. The prior art converts the R1,R2,G1,G2,B1,B2 digital video signals into RGB signals by pulsewidth modulating the RGB signals using the computers video clock. The method used in the prior art cannot be modified to convert analog signals to have an 8 color monitor produce the infinite colors necessary to display a TV image. Its limiting factor is the use of the video dot clock for the pulsewidth modulation. In order to obtain infinite colors an infinite dot clock would be required, which is impossible. At best, the prior art method would produce a grainy looking display i.e., where a smooth transition of a particular color is required, a staircase transition of brightness would occur due to the limiting number of colors (brightness levels) it can produce. Even if a theoretical video clock was generated at an infinite frequency, and theoretical integrated circuits were invented, the prior art method would not be practical due to the number of components required and the cost involved. The present invention overcomes the shortcomings of the prior art by comparing a reference analog ramp voltage with the analog video signal which produces a digital signal whose pulsewidth is proportional to the video signal's amplitude, thus allowing an infinite number of pulsewidths which corresponds to an equal number of colors. The invention is an extremely efficient method to increase the number of colors that can be displayed on an 8 color monitor.

SUMMARY OF THE INVENTION

The object of the invention is to allow the owner of a TTL color monitor, along with a VCR, to convert the monitor to a TV set, displaying infinite colors, for considerably less cost than buying a color TV set.

The invention has an audio input, audio amplifier and a speaker for sound. It has an NTSC input with a sync-separator circuit, an NTSC decoder circuit which produces RGB analog, a ramp generator, and a pulse width modulation section. The output of the Analog To Digital Video Adapter provides the RGB, horizontal sync, and vertical sync signals to the color monitor. While the monitor is not an analog monitor, the pulse width modulation (PWM) similates analog signals. The PWM video appears to be analog since the human eye will see the level of brightness proportional to the time the video is on, if the sampling rate is high enough.

The controls on the invention are the same as on a TV set; i.e. contrast, brightness, tint, color and audio. An additional control is added to adjust the sampling frequency of the PWM section.

DETAILED DESCRIPTION OF THE INVENTION

Figure 1:
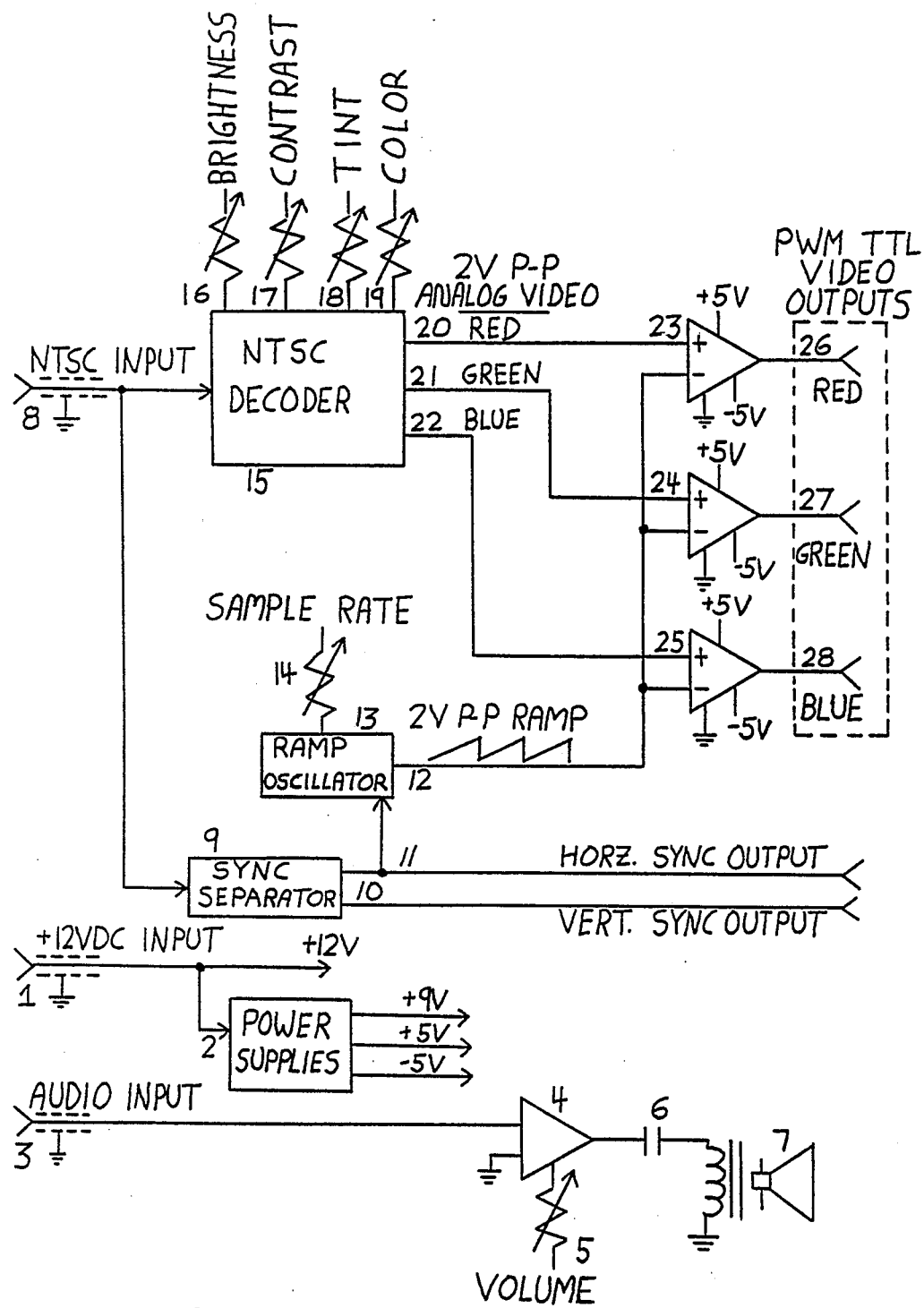
FIG. 1 is a combination block diagram and circuit drawing for the invention. Blocks indicate where standard circuits are used, while the heart of the invention is shown in detail.

Referring to the drawing shown in FIG. 1, numeral 1 designates the connector for the power input. The invention is powered from a +12 v DC adaptor. The +12 v is used to generate the other voltages necessary: +9 v, +5 v, −5 v, shown in numeral 2, Power Supplies. The signal from the audio input connector 3, is amplified by the audio amplifier 4, whose volume is controlled externally by adjustment 5. The audio signal is then AC coupled through capacitor 6, to the speaker 7.

The NTSC analog video input signal 8, is processed by a sync-separator circuit 9, then sends the two TTL signals vertical sync 10, and horizontal sync 11, to the color monitor to synchronize the vertical and horizontal to the video. The ramp signal 12 is generated in the ramp oscilator section 13, whose frequency is controlled externally by the sample rate control 14. It is important that the ramp signal 12 is synchronized to the horizontal sync 11, for a steady display.

The NTSC input 8 is also processed by the NTSC decoder 15. NTSC decoding is done is every color TV produced and many different methods and IC's can be used. The external controls on the NTSC decoder 15 are brightness 16, contrast 17, tint 18, and color 19, which have identical functions as on all TV sets. The NTSC decoder 15 breaks down the NTSC input into 3 distinct outputs, one for each color; red 20, green 21, blue 22. These signals are analog video signals, in that their voltage level is proportional to the desired brightness level.

The ramp signal 12 goes from +1 v to +3 v DC. The red 20, green 21 and blue 22 signals are adjusted by the brightness 16 and contrast control 17 to correspond with the ramp signal 12. That is, for no brightness, their voltages will be +1 v DC, and for maximum brightness their voltages will be +3 v DC. It was determined that for best results, the ramp frequency 12 should be at least 7 MHZ, two times the bandwidth of the red 20, green 21 and blue 22 signals.

The ramp signal 12 is then compared against the analog RGB signals 20, 21, 22 by a high speed voltage comparator 23, 24, 25. Since the ramp signal 12 is applied to the inverting input of the comparators 23, 24, 25, the respected output signals red 26, green 27 and blue 28 are high (+5 v) when the analog input signals 20, 21 and 22 are greater than the ramp voltage 12. Therefore, the outputs 26, 27 and 28 are pulse width modulated such that the pulse width is proportional to the analog voltage of the video input signals 20, 21, 22 and it is updated at the ramp frequency 12. The RGB digital TTL signal 26, 27, 28 along with the vertical sync 10 and horizontal sync 11, provided all the signals necessary to convert an 8 color RGB TTL color monitor to a TV set.

While the above describes the use of PWM for converting analog video to digital video for the purpose of driving a monitor, this process can also be used to store video information in memory for many purposes, such as high definition TV, digital TV, or image storage.

The disclosure of the invention described hereinabove represents the preferred embodiments of the invention; however, variations thereof, in the form, construction, and arrangements of the various electronic components thereof and the modified application of the invention are possible without departing from the spirit and scope of the appended claims.

I claim:

1. An analog to digital adapter which converts standard broadcast video signals to TTL signals for driving an 8 color monitor to display TV and TV-like images comprising: a color decoder circuit that separates the red, green, and blue information from the standard broadcast video signals into three analog signals, a sync separator circuit that detects th horizontal and vertical synchronization signals from the video signals, a ramp generator that is synchronized to the video signals, three comparator sections which compare the ramp signal to each red, green, and blue analog signal, each section outputting a TTL signal whose pulsewidth is proportional to the analog signal amplitude and is sampled at the ramp signals frequency, whereby the outputs of the comparator sections drive an eight color TTL monitor to display as many colors as are present in the broadcast video signal.

2. An analog to digital video adapter described in claim 1, wherein the outputs drive any kind of TTL monitor such as monochrome monitors as well as any TTL color monitor regardless of the amount of colors the monitor is able to display.

* * * * *